United States Patent [19]

Lipo et al.

[11] Patent Number: 4,942,511
[45] Date of Patent: Jul. 17, 1990

[54] STATIC POWER CONVERSION APPARATUS USING A HIGH FREQUENCY SERIES RESONANT DC LINK

[75] Inventors: Thomas A. Lipo, Madison, Wis.; Yoshihiro Murai, Seki, Japan

[73] Assignee: Wisconsin Alumni Research Foundation, Madison, Wis.

[21] Appl. No.: 414,202

[22] Filed: Sep. 28, 1989

[51] Int. Cl.[5] .......................................... H02M 7/521
[52] U.S. Cl. ...................................... 363/136; 363/37; 363/137
[58] Field of Search ...................... 363/34, 37, 95, 96, 363/136, 137

[56] References Cited

U.S. PATENT DOCUMENTS

| 3,222,587 | 12/1965 | Lichowsky | 363/37 |
| 3,940,669 | 2/1976 | Tsuboli et al. | 363/137 |
| 4,638,138 | 1/1987 | Rosa et al. | 363/37 |
| 4,730,242 | 3/1988 | Divan | 363/37 |
| 4,805,082 | 2/1989 | Heinrich et al. | 363/37 |
| 4,864,483 | 9/1989 | Divan | 363/37 |

OTHER PUBLICATIONS

Pradeep K. Sood and Thomas A. Lipo, "Power Conversion Dibstribution System Using a Resonant High--Frequency AC Links", IEEE-IAS Annual Meeting Conference Record, Mar. 1986, pp. 533–541.
Hian K. Lauw et al., "Variable-Speed Generation with the Series-Resonant Converter," IEEE Transaction on Energy Conversion, vol. 3, No. 4, Dec. 1988, pp. 755–764.
Sjoerd W. H. de Haan and J. D. Lodder, "A Formalistic Approach to Series–Resonant Power Conversion," EPE Conference Record, May 1987, pp. 231–238.
D. M. Divan, "The Resonant DC Link Converter—A New Concept in Static Power Conversion," IEEE-IAS Annual Meeting Conference Record, Mar. 1986, pp. 648–656.
D. M. Divan and G. L. Skibinski, "Zero Switching Loss Inverters for High Power Applications," IEEE-IAS Annual meeting Conference Record, Feb. 1987, pp. 627–634.
D. M. Divan, "Diodes as Pseudoactive Elements in High-Frequency DC/DC Converters," PESC 1988, Kyoto, Japan, Apr. 1988.
D. M. Divan, "Power Converter Topologies for High Performance Motion Control Systems," 1987 CAMC Conference Report, Jun. 1987.
D. M. Divan, "Design Consideration for Very High--Frequency Resonant Mode DC/DC Converters," 1986 IAS Conference Report, Oct. 1986.

Primary Examiner—Mark O. Budd
Assistant Examiner—Jeffrey Sterrett
Attorney, Agent, or Firm—Lathrop & Clark

[57] ABSTRACT

A high efficiency power converter is achieved which eliminates the needs for self-commutated devices and requires only twelve thyristors for full double bridge AC/AC power conversion. The system utilizes a series resonant DC link between the AC/DC and DC/AC converters. The DC resonant circuit functions as a commutating circuit which ensures turn off of all twelve thyristors by providing the necessary zero current instants. A significantly improved sinusoidal current waveform can be obtained on both the input and the output compared to conventional high power converters by the use of high frequency pulse density modulation.

13 Claims, 16 Drawing Sheets

STATIC POWER CONVERSION APPARATUS USING A HIGH FREQUENCY SERIES RESONANT DC LINK

TECHNICAL FIELD

This invention pertains generally to the field of static power converters and systems for the control of static power converters.

BACKGROUND OF THE INVENTION

In the past few years remarkable progress has been made in the development of high power density AC/DC converters using resonant-link schemes which utilize high speed devices such as fast recovery transistors and GTO's. These new converters not only have high power density but also possess very low switching losses because switching of the devices takes place at zero-voltage instants and thus the total system is able to operate at very high frequency compared to conventional DC link transistorized converters. Although these resonant-link converters are intended to operate at high power density, almost all the systems require self commutated switching devices and have some difficulty performing conversion at very high power levels because of the relatively low voltage and current margins that self commutated devices, such as transistors, typically have.

In general, switching schemes for resonant converters can be classified according to their resonant AC-link and resonant DC-link modes. The resonant AC circuits utilize either a parallel resonant circuit (FIG. 1) or a series resonant circuit (FIG. 2). The AC resonant circuit impresses both polarities of AC voltage and current on the link so that the switches of the input and output side converters are required to carry both positive and negative currents as well as block both polarities of voltage. The converter switches must therefore be bi-directional switches which are usually realized by two inverse-parallel transistors or thyristors for the parallel and series resonance circuits, respectively.

DC-link circuits have been developed which realize pulsating DC currents in the link by adding DC offsets to the AC resonant current. The resonant DC-link converters reported in the past have been parallel resonant types, as shown in FIG. 3. See also, U.S. Pat. No. 4,730,242 to Divan, which discloses parallel resonant link converter systems wherein the switching devices are switched at times of zero voltage to minimize switching losses.

SUMMARY OF THE INVENTION

A power conversion system in accordance with the present invention utilizes a series resonant DC-link involving a configuration which employs only unidirectional switches. Unlike the DC parallel resonant converters in which switching of the converter switches occurs at zero-crossing instants of voltage, the present invention utilizes switching of the converter switches only at the zero-crossing instants of the link current. Since the current drops below the holding current, the natural turn-off ability of a conventional thyristor is utilized for commutation. Thus, high power thyristors can be utilized with minimal switching loss. Since the link current is unidirectional, only the usual six thyristors are needed per converter bridge.

The present invention provides a power conversion system which utilizes a series resonant DC-link between the AC/DC and DC/AC converters which provides a natural commutation capability and allows for interruptible switching. By using pulse density modulation this circuit enables the realization of low distortion sinusoidal current as well as unity power factor on both the AC/DC and DC/AC side converters.

The invention further provides a power conversion system utilizing a series resonant DC-link which eliminates oscillation in the output through the use of derivative feed-back and damping circuits.

Further objects, features, and advantages of the invention will be apparent from the following detailed description when taken in conjunction with the accompanying drawings.

DESCRIPTION OF THE PREFERRED EMBODIMENT

Figure 1:
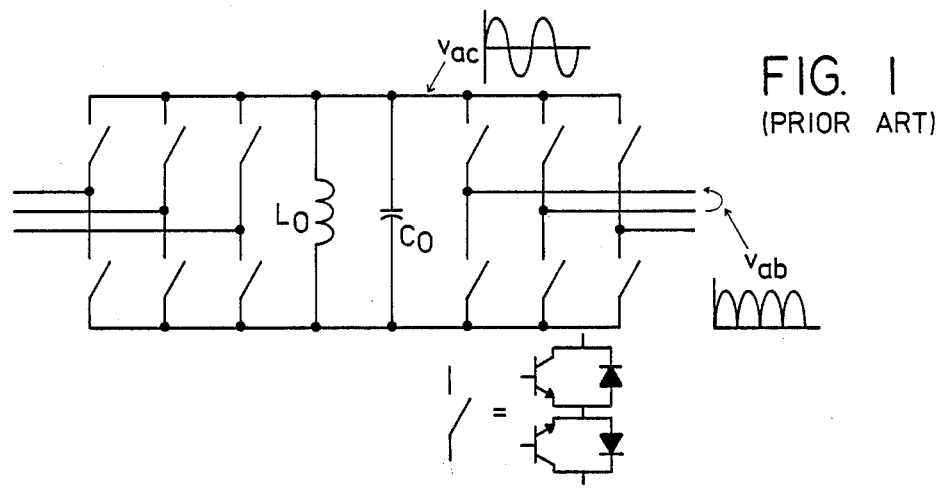
FIG. 1 is a schematic circuit diagram of a prior art parallel resonant AC-link power converter.
Figure 2:
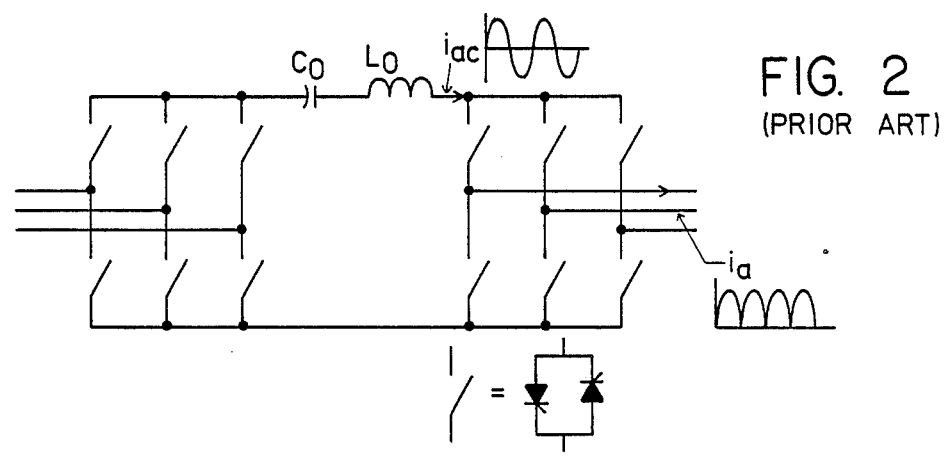
FIG. 2 is a schematic circuit diagram of a prior art series resonant AC-link power converter.
Figure 3:
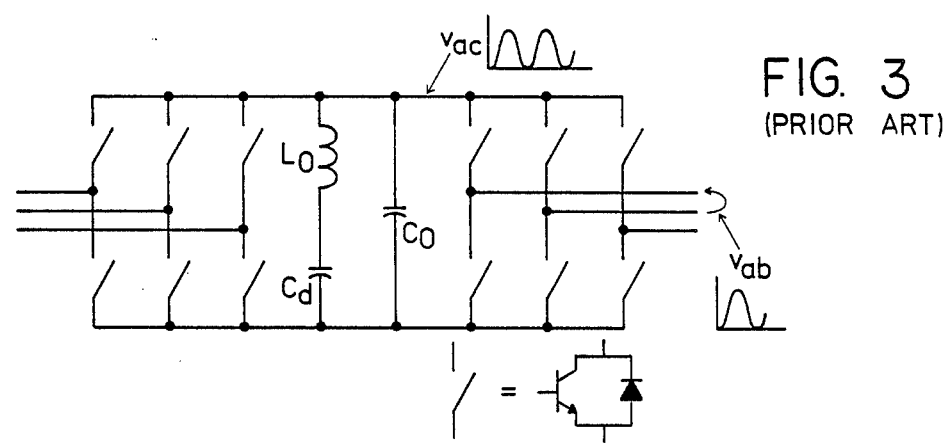
FIG. 3 is a schematic circuit diagram of a prior art parallel resonant DC-link power converter.
Figure 4:
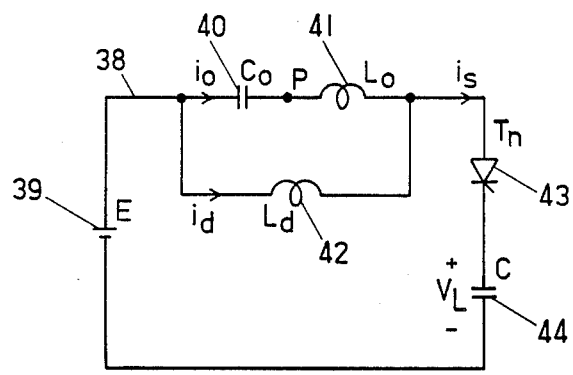
FIG. 4 is a schematic circuit diagram showing a series resonant circuit, with parallel inductance $L_d$.

To illustrate the principles of the present invention, a series resonant circuit 38 is shown in FIG. 4 which can be controlled to function as a DC resonant link. The circuit 38 includes a direct current (DC) voltage source power supply 39, a series resonant capacitor 40 (of capacitance $C_o$), a series resonant inductor 41 (of inductance $L_o$), a DC bias current inductor 42 (of inductance $L_d$), a load thyristor 43, and a load capacitor 44. The capacitor 40 and inductor 41 are the resonant elements selected to resonate at a frequency consistent with the turn off capability of the load thyristor 43 and are relatively small. The DC bias inductor 42 is a larger inductor which is controlled to support the DC bias current. The currents in FIG. 4 are obtained from the following equations:

$$E = \frac{1}{C_o} \int_0^t i_o dt + L_o \frac{di_o}{dt} + V_L$$

$$E = L_d \frac{di_d}{dt} + V_L$$

-continued $$V_L = \frac{1}{C} \int_0^t i_s dt$$

$$i_s = i_0 + i_d$$

Assume the load thyristor 43 shown in FIG. 4 is switched to the conducting state at t=0. If the DC bias inductor 42 and load capacitor 44 are sufficiently large to maintain the current $i_d$ and voltage $V_L$ constant, then the current $i_s$ is easily solved by defining the intial conditions, $$i_d = I_d, \quad i_0 = -I_d$$

$$(i_s = 0, \text{ at } t = 0)$$

$$V_c = V_{c0}$$

where $I_d$ and $V_{c0}$ are constants. The solution to these equations is $$i_0 = \sqrt{\frac{C_0}{L_0}} \, E' \sin\omega t - I_d \cos\omega t$$

$$\omega = \sqrt{\frac{1}{L_0 C_0}}$$

and $$i_s = i_0 + i_d$$

$$= \sqrt{\frac{C_0}{L_0}} \, E' \sin\omega t + I_d(1 - \cos\omega t)$$

Where $E' = E - v_L - v_{C0}( > 0)$.

Letting, $$i_x = I_d(1 - \cos\omega t), \quad i_y = \sqrt{\frac{C_0}{L_0}} \, E' \sin\omega t$$

the current in the link can be written as, $$i_s = i_o + i_d.$$

Figure 5:
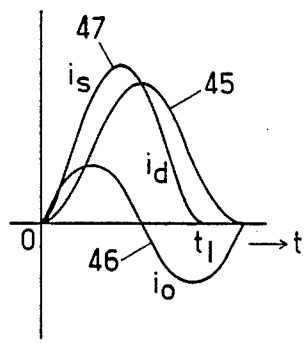
FIG. 5 are graphs illustrating the current waveforms in the circuit of FIG. 4.
Figure 6:
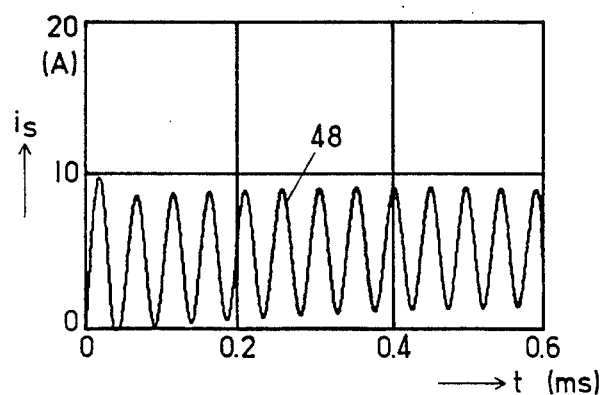
FIG. 6 is a graph illustrating the source current waveform for the circuit of FIG. 4.

Typical waveforms for the currents $i_o$, $i_d$, and $i_s$ are shown in graphs 45, 46, and 47 respectively, in FIG. 5. As long as the voltage E' remains positive, the link current reaches zero and the load thyristor 43 is able to commutate at t=t$_1$. Unfortunately, however, in an actual circuit with a finite inductor 42 and finite capacitor 44, the current $i_d$ continues to increase if E' is positive and makes the commutation of load thyristor 43 very difficult, as shown by graph 48 in FIG. 6. Because the resonant link current fails to reach zero during any portion of the resonant cycle, it is impossible to turn off the load thyristor 43.

Figure 7:
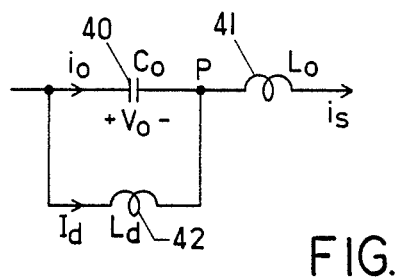
FIG. 7 is a schematic circuit diagram showing an alternate configuration of the series resonant components shown in the circuit of FIG. 4.

FIG. 7 shows an improved connection in which the DC bias inductor 42 is connected in parallel with the resonant capacitance 40. As the voltage across the inductor 42 changes according to the capacitor voltage $V_o$, commutation of the thyristor becomes possible because the resonant current has an oscillation which is not growing, as shown by graph 49 in FIG. 8.

Figure 9:
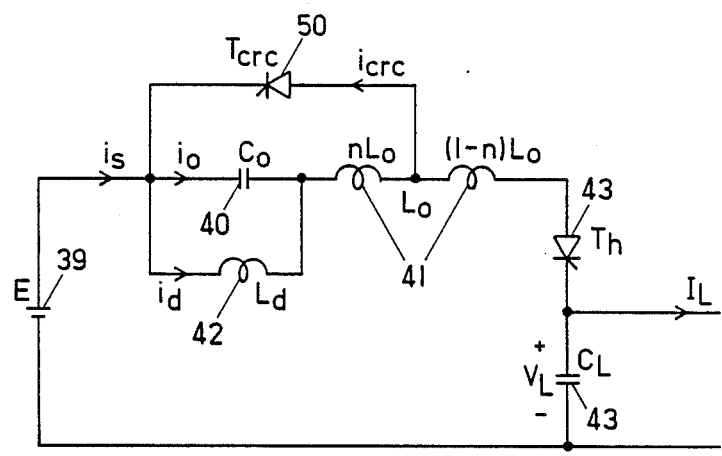
FIG. 9 is a schematic circuit diagram illustrating a series resonant circuit with a circulating current thyristor.

In order to prevent overcharging of the resonant capacitor 40 during the zero current intervals, a circulating thyristor 50 and tapped inductor 41 can be utilized as shown in FIG. 9. The thyristor 50 is triggered to circulate the current $i_0$ whenever $i_s$ becomes zero. This zero current condition is also required to regulate the output current of the inverter for pulse density modulation and will be described below.

Figure 10:
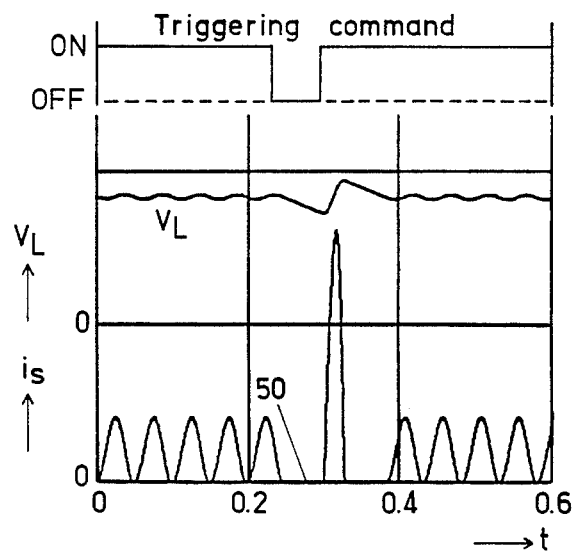
FIG. 10 are graphs illustrating circuit behavior of the circuit of FIG. 9 without the circulating current thyristor.
Figure 11:
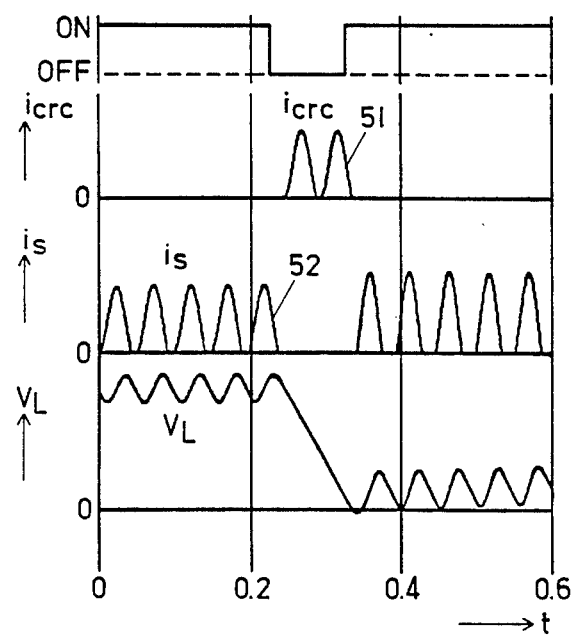
FIG. 11 are graphs illustrating the circuit behavior of the circuit of FIG. 9 with the circulating current thyristor.

FIGS. 10 and 11 show the current $i_s$ and voltage $V_L$ waveforms with and without use of the circulating current thyristor 50, respectively. When a signal to stop firing the load thyristor 43 occurs, a dead zone appears in the source current waveform as shown by graph 50 in FIG. 10. As a result, the average output voltage $V_L$ does not change substantially and a large pulse of current appears when conduction of the load thyristor 43 commences again. Alternatively, for the case with the circulating thyristor 50 present, the current $i_s$ is readily interrupted while the load thyristor 43 triggering signal is set to zero and a current $i_{crc}$ flows during this period, as shown by graphs 51 and 52 of FIG. 11.

In practice, the circulating thyristor 50 can be fired not only when a stop signal for $i_s$ appears, but can also function as a clipper for $i_s$ and $V_L$, in which case the resonance of the LC tank becomes quite stable. The tap ratio n (n<1) of the resonant inductance 41, shown in FIG. 9, affects the sensitivity of the clipping ability of the circulating thyristor 50. If n is set to a large value, the overshoot of current $i_s$ and the voltage $V_L$ increase and the resonance tends to become unstable. On the other hand, when n is chosen very small (nearly zero), the current $i_s$ goes to zero rapidly whenever the voltage $V_L$ becomes equal to E and the necessary zero current cannot be attained.

Figure 8:
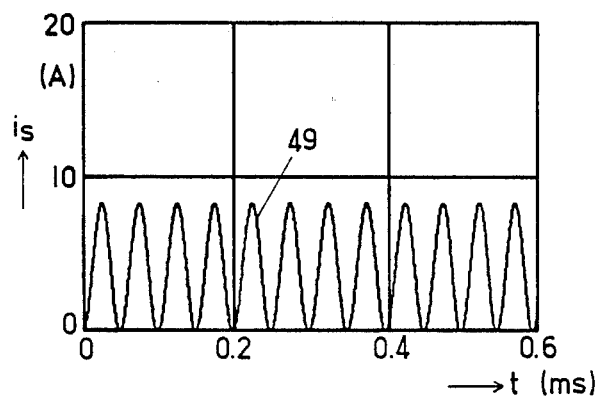
FIG. 8 is a graph illustrating the source current waveform for the circuit of FIG. 7.
Figure 12:
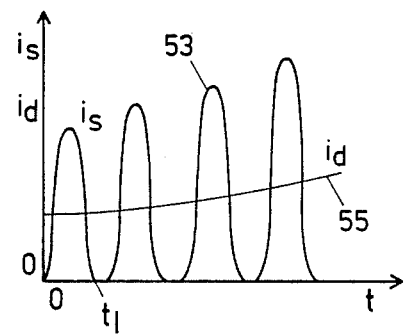
FIG. 12 are graphs illustrating link current waveforms without regulation of current through the DC bias inductor.
Figure 13:
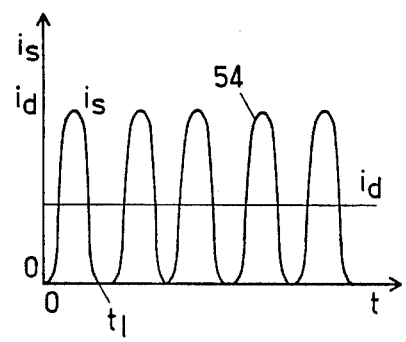
FIG. 13 are graphs illustrating link current waveforms with regulation of current through the DC bias inductor.

In order to maintain control of the amplitude of the pulses as illustrated by graph 49 in FIG. 8, regulation of the DC link current $i_s$ is required. Graph 53 in FIG. 12 and graph 54 in FIG. 13 illustrate how the link current $i_s$ varies without and with regulation, respectively. In general, the average value of the current pulse is approximately proportional to $i_d$. When E' is large, $i_s$ increases and $i_d$ also increases, as shown by graphs 53 and 55 in FIG. 12. After $i_s$ reaches zero at $t=t_1$, the load thyristor 43 turns off and the current $i_d$ charges up the resonant capacitor 40 generally to a larger value than that which existed on the capacitor before the previous pulse. After each subsequent turn on of the load thyristor 43, the current $i_d$ and $i_s$ pulses continue to increase as shown by graphs 53 and 55 in FIG. 12. Hence, current regulation for this type of converter is mandatory.

Figure 14:
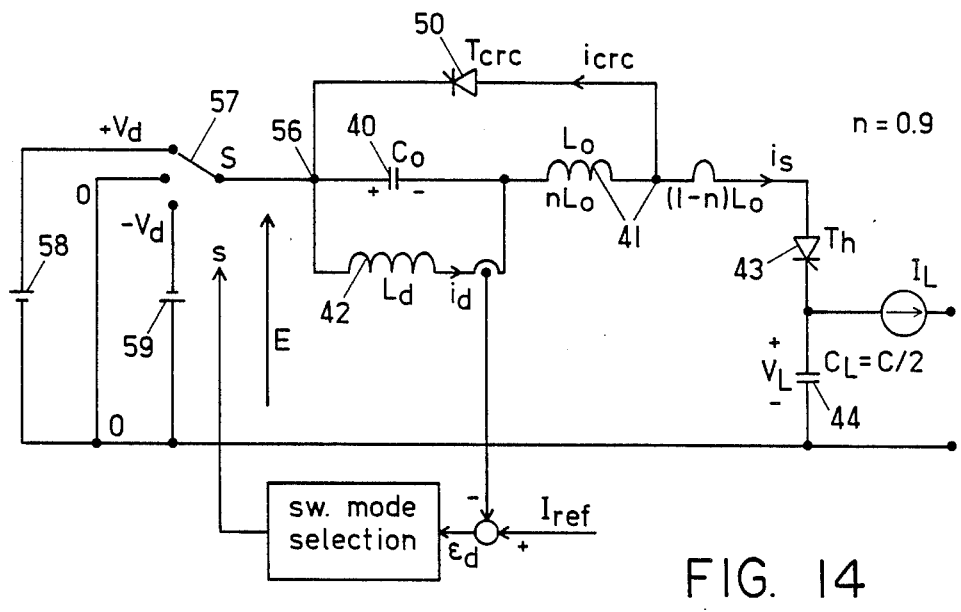
FIG. 14 is a schematic circuit diagram of a current control scheme to control current through the DC bias inductor.

Regulation of the DC inductor current $i_d$ is accomplished very easily by current feedback as shown in FIG. 14. A circuit 56 includes a three pole switch 57 which may be connected to either a positive voltage source 58, negative voltage source 59, or to a short circuit condition for which the voltage E is equal to zero. After comparing $i_d$ with the current reference $I_{dref}$, the source voltage E is adjusted via the switch 57 to make the error small. For example, if the error $\epsilon_d = I_{dref} - I_d$ is positive, E is switched from $V_d$ to zero or $-V_d$; if $\epsilon_d$ is negative, it goes from $-V_d$ to zero or $V_d$. As the ability to control $i_d$ also depends on E' (=E-$V_L$), the measured value of $V_L$ is used for this purpose. While the load thyristor 43 is off, the DC bias inductor 42 charges up the resonant capacitor 40 to a negative polarity to prepare for conduction of the load thyristor 43. The current $i_s$ carries the energy from the resonant circuit to the load or AC source depending upon the polarity of $V_L$ and E. When E is negative, energy flows back to the source and when $V_L$ is positive the energy flows to the load.

Figure 15:
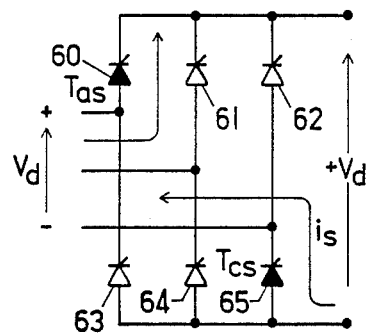
FIG. 15 is a schematic circuit diagram of an AC/DC converter in a motoring mode.
Figure 16:
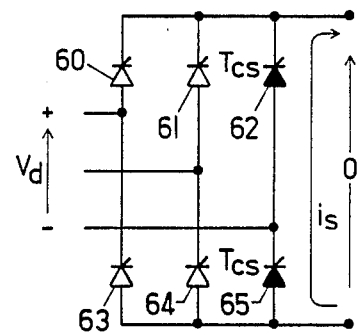
FIG. 16 is a schematic circuit diagram of an AC/DC converter in a circulating mode.
Figure 17:
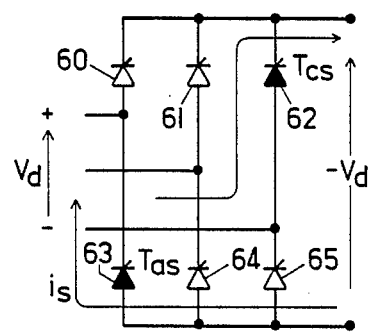
FIG. 17 is a schematic circuit diagram of an AC/DC converter in a regenerating mode.

Thus far, it has been assumed that the source voltages are essentially constant. Since the source voltages are, in fact, alternating, the identity of the most positive and most negative phase must be established before switching of the source side bridge can commence. The selection of the source voltages, utilizing a common three phase bridge, are easily accomplished as shown in FIGS. 15, 16, and 17. When positive, a large positive voltage E' is needed to cause the current $i_d$ to increase. The bridge thyristors 60-65 are triggered as shown in heavy lines in FIG. 15 and supply positive voltage $V_d$ to the resonant current. FIG. 16 shows the zero voltage mode and FIG. 17 shows the negative voltage mode. These modes are used to decrease the current $i_d$. As $i_s$ is always positive, the configuration of FIG. 17 regenerates back to the AC source.

Figure 18:
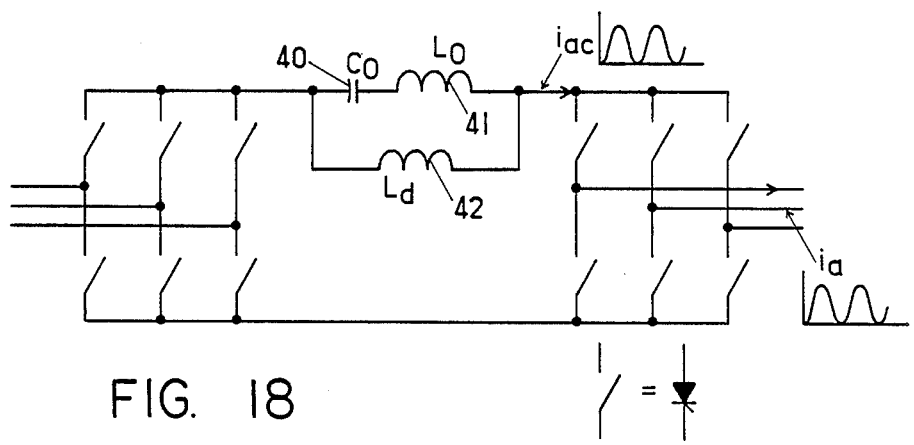
FIG. 18 is a schematic circuit diagram illustrating the formation of a series resonant DC-link power converter.
Figure 19:
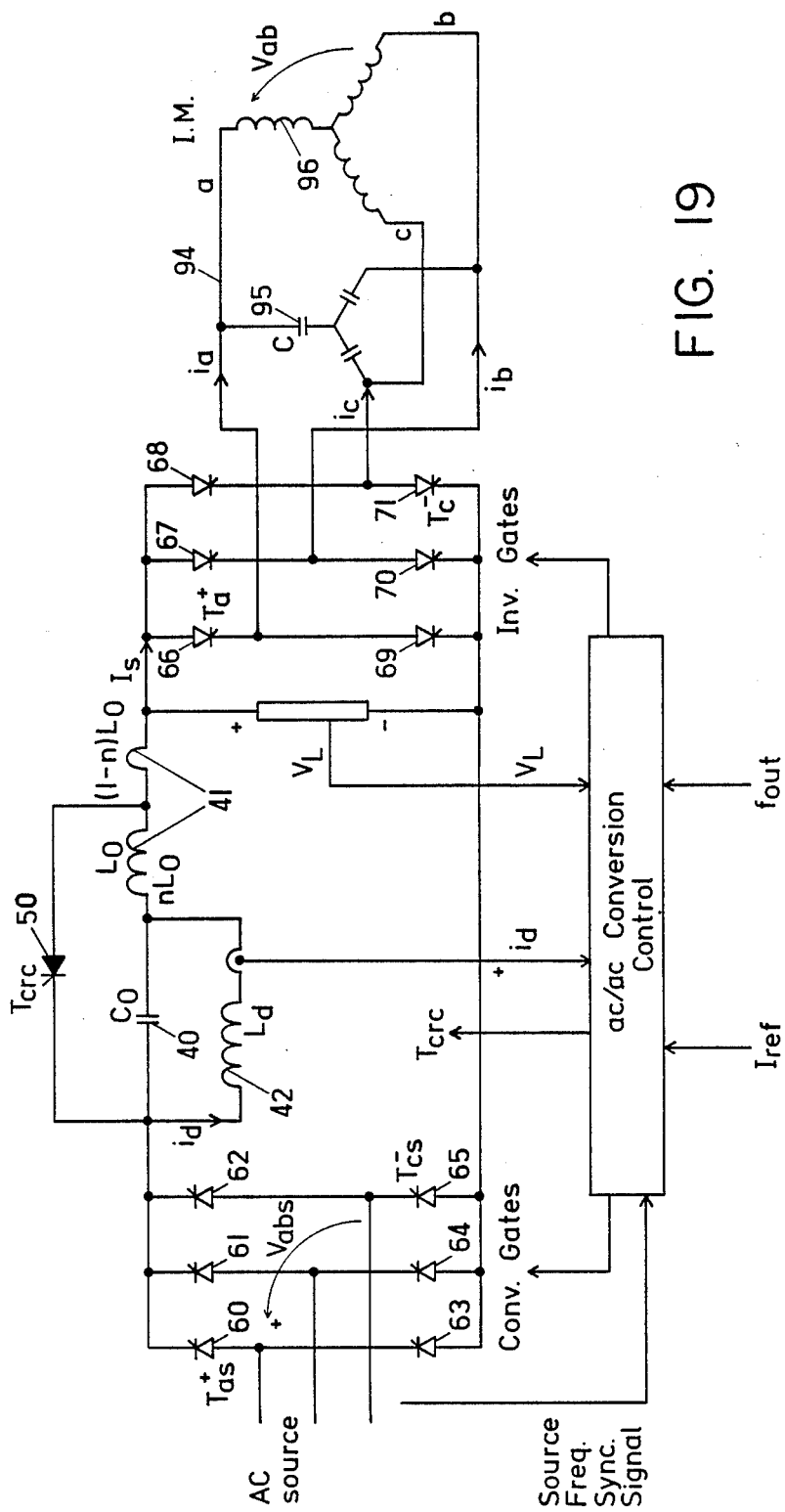
FIG. 19 is a schematic circuit diagram showing the detailed circuit implementing the series resonant DC-link scheme.

When the DC series resonant link circuit is used in a three phase front end bridge circuit in conjunction with a three phase inverter circuit as shown in FIG. 18, and in further detail in FIG. 19, the pulses generated in the resonant circuit must be distributed to each inverter phase. The thyristors 66-71 in FIG. 19 function as a distributor to switch or redirect the link current at the instants where the current $i_s$ is equal to zero. Since the circuit is resonant, this instant occurs when nearly zero voltage exists across the thyristor so that the losses in the thyristors are relatively small. Graphs 72, 73, and 74 in FIG. 20 show the pulse density distribution for each phase in the output of the DC/AC side converter.

Figure 20:
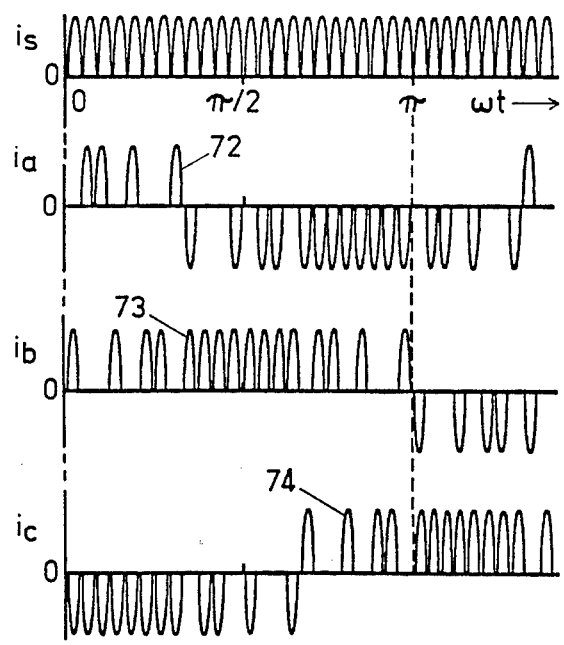
FIG. 20 are graphs illustrating the distribution of current pulses to a three-phase load.
Figure 21:
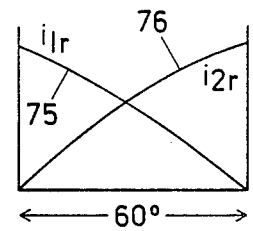
FIG. 21 are graphs illustrating current reference waveforms.
Figure 22:
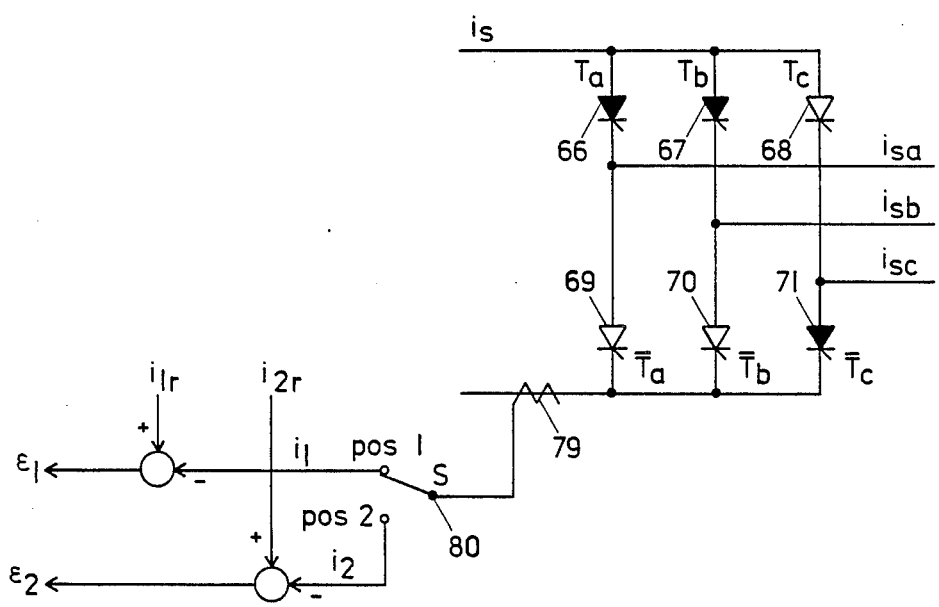
FIG. 22 is a schematic circuit diagram of a current feed-back selection circuit.

The distribution of the pulses to each phase as illustrated in FIG. 20 is automatically determined by comparing the current pulses with the instantaneous phase currents. FIG. 21 shows the current references $i_{1r}$ and $i_{2r}$, FIG. 22 shows the corresponding phase currents $i_{sa}$, $i_{sb}$, and $i_{sc}$ and the conducting thyristors in the converter. For example, the current references $i_{1r}$ and $i_{2r}$ correspond to $i_{sa}$ and $i_{sb}$ within the first 60 degrees, at which point thyristors 66, 67, and 71 are triggered. In the next 60 degrees, these currents correspond to $-i_{sc}$ and $-i_{sa}$ and thyristors 71, 69, and 67 are triggered and so on. Accordingly, the same reference table is repetitively used and makes the ROM table very small. The currents $i_1$ and $i_2$ are detected from a current sensor 79 with sampling switch 80, as shown in FIG. 22, which is operated sychronized to the triggering signal of the DC/AC converter thyristor firing instants.

Figure 23:
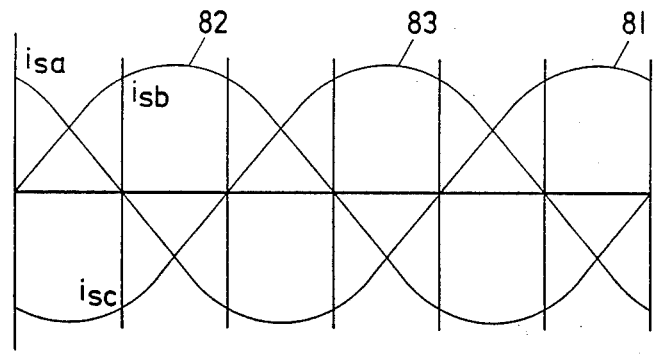
FIG. 23 is a current and thyristor selection table.
Figure 24:
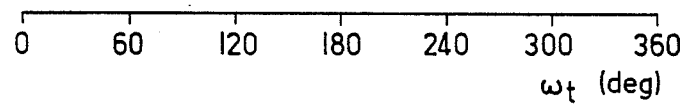
FIG. 24 is a table illustrating the polarity of current error for each of the operating modes.

The DC/AC converter thyristors are triggered to reduce the maximum error of the three phase currents. Errors $\epsilon_a$, $\epsilon_b$, $\epsilon_c$ are obtained from $\epsilon_1$, $\epsilon_2$ depending upon the chart shown in FIG. 23. FIG. 24 shows the possible combinations of the $\epsilon_a$, $\epsilon_b$, and $\epsilon_c$ for $i_{sa}$, $i_{sb}$, $i_{sc}$, respectively.

As the sum of the errors must satisfy the relation $$\epsilon_a + \epsilon_b + \epsilon_c = 0$$

all the three errors clearly cannot have the same polarity. As the output circuit does not have any neutral line, the current pulse should flow into the postive error phase and flow out from the negative error phase. Hence, the triggering principle is (i) the thyristor in the phase having the larger error out of the two phases of the same polarity is chosen to be triggered;

(ii) the phase corresponding to the error with the opposite polarity error is selected as the other triggering phase.

Figure 25:
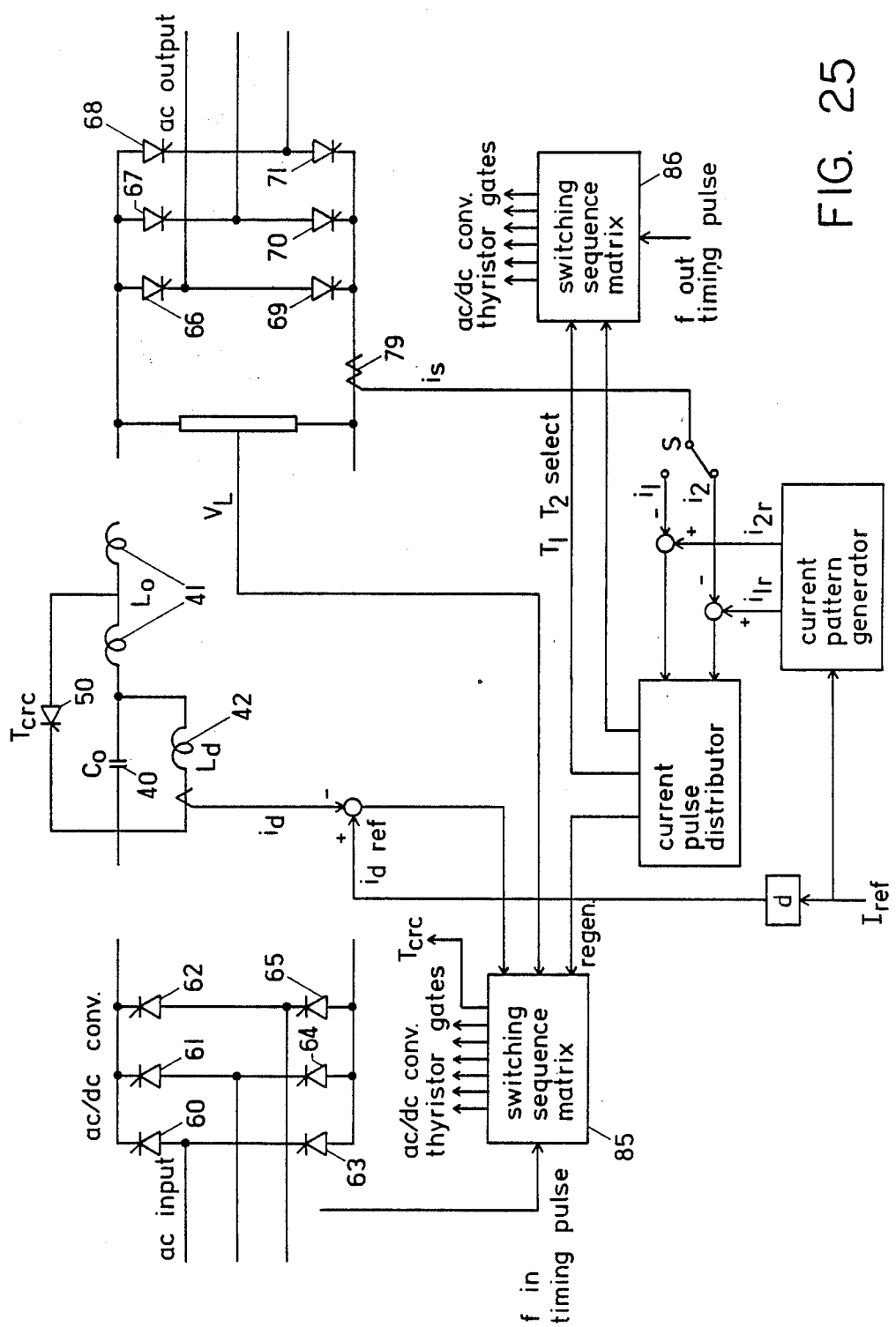
FIG. 25 is a schematic circuit diagram of the control circuit for the overall system.

For example, in FIG. 24, if $\epsilon_a$ and $\epsilon_b$ are positive then $\epsilon_c$ must be negative. This condition can be termed as mode 1. If $\epsilon_a$ is larger than $\epsilon_b$, the triggering thyristor is selected to be thyristor 66, and the other thyristor becomes thyristor 71. FIG. 25 shows the schematic diagram of the overall control system. The mode matrix and comparison gate of currents are included in the block switching matrix 86. The AC/DC thyristors 66–71 are triggered by applying the chart shown in FIG. 23. The thyristors shown on the chart are triggered when positive $V_d$ is required on the DC side and these patterns are sychronized to the AC input voltage by the timing pulse $f_{in}$.

When a negative voltage $E = -V_d$ is required the triggering thyristors in the chart are replaced from top to bottom or bottom to top of the bridge. As explained previously, circulating thyristor 50 is not triggered while $E' = E - V_L$ is less than $V_{dl}$ (>0). Current $i_d$ is regulated to a value three times that of $i_{dref}$ ($k_d = 3$) in order to ensure sufficient gain to control the load current.

Figure 26:
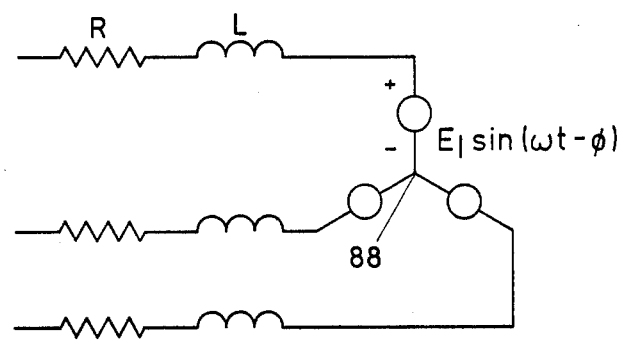
FIG. 26 is a schematic circuit diagram showing a first load circuit.
Figure 27:
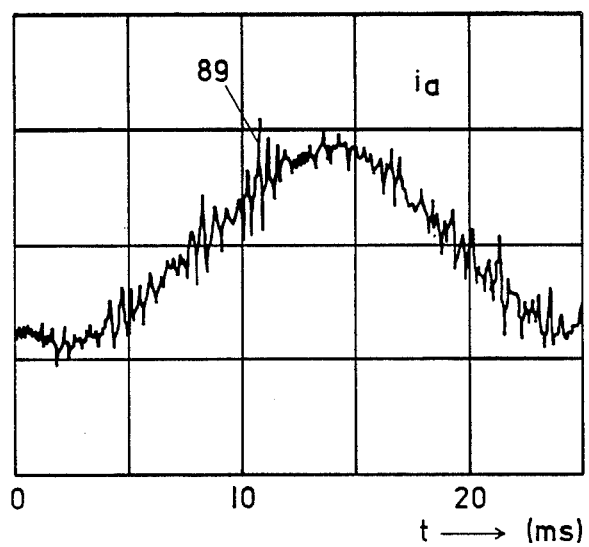
FIG. 27 is a graph illustrating current waveforms for a first set of load conditions.
Figure 28:
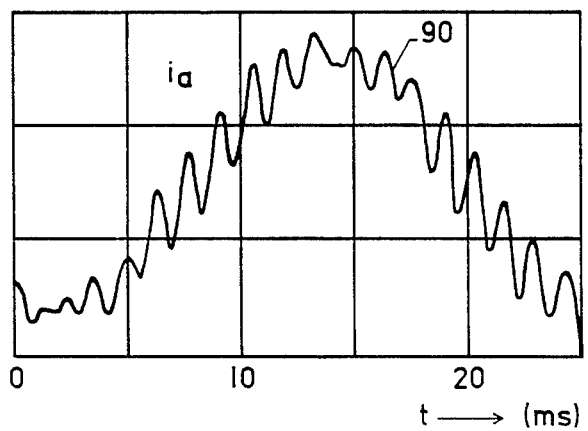
FIG. 28 is a graph illustrating current waveforms for a second set of load conditions.

FIGS. 27 and 28 show the resulting current waveforms obtained by a computer simulation. A three phase R-L load with back EMF shown generally at 88 in FIG. 26 has been utilized. Graph 89 in FIG. 27 was obtained for the case R=5Ω, L=1.0 mH, E=100 v, $\phi = -10$ deg, $L_d = 5$ mH, $L_o = 79$ μH, $C_o = 0.79$ μF, $\omega_0 = 2\pi \times 20,000$ rad/sec. In addition, the actual simulation includes a resistance $r_0 = 0.05\Omega$ as part of the DC bias inductor 42 ($L_o$) to express the lossy component in the resonant circuit. The waveform shown by graph 89 in FIG. 27 appears to be very satisfactory. However, when the resistance R and L are replaced by an induction motor load, shown generally at 94 in FIG. 19, (200 v, 1.5 kw), i.e., R=1.0Ω and L=2 mH, a high frequency oscillation appears as shown by graph 90 in FIG. 28. This oscillation is clearly caused by interaction of the filter capacitance 95 and motor load inductance 96 as shown in FIG. 19. Since the loop of the oscillation involves two C's and two L's in series, the resonant frequency $f_r$ is $$f_r = \frac{1}{2\pi \sqrt{(2L)(C/2)}} = \frac{1}{2\pi \sqrt{LC}}$$

For this case $f_r = 1250$ Hz. This phenomena appears to be a generic problem for any current source converter having output capacitance and is not peculiar to this circuit alone.

Figure 29:
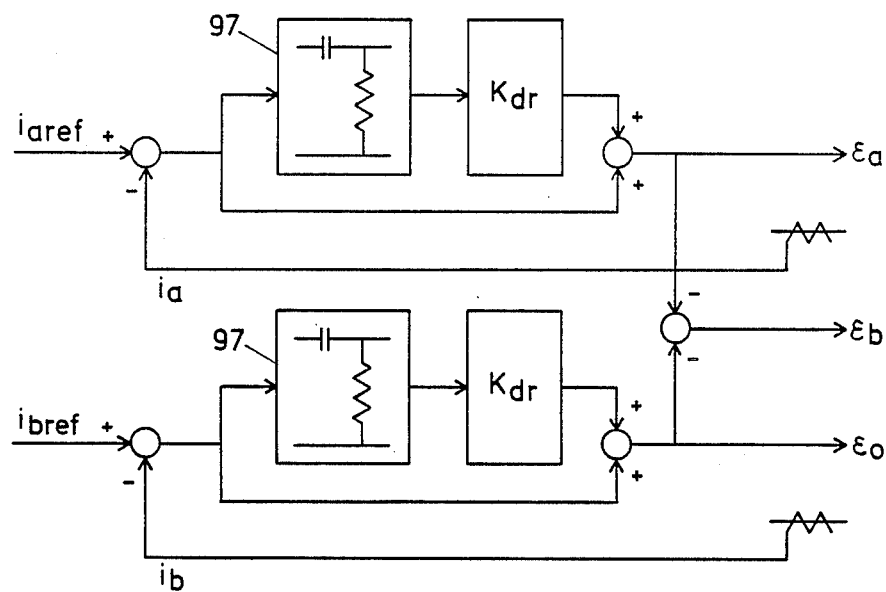
FIG. 29 is a block diagram of the power converter system illustrating the use of a current feed-back loop with a derivative element.
Figure 30:
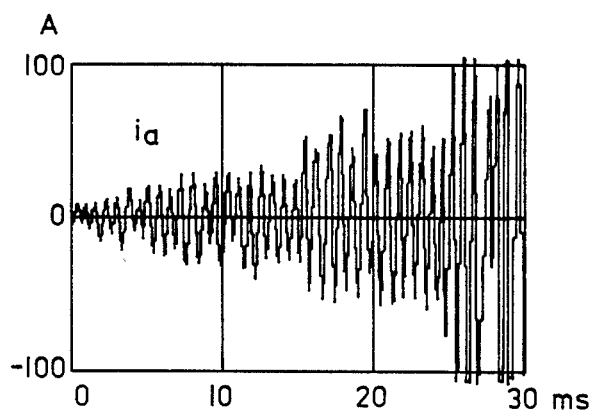
FIG. 30 is a graph illustrating output current without the use of derivative feed-back.
Figure 31:
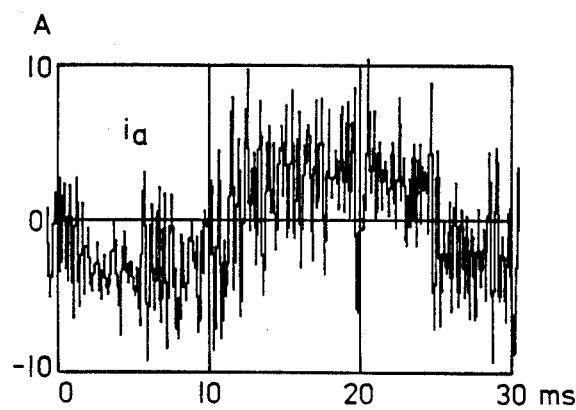
FIG. 31 is a graph illustrating output current with derivative feed-back.

The stabilization of the system is difficult by controlling the current $i_s$ only. Even if the system is accurately controlled, the oscillation remains between the capacitor 95 and load inductance 96, as shown in FIG. 19, almost independent from the inverter $i_s$. Stabilization was, however, accomplished by controlling the motor currents, $i_a$, $i_b$, and $i_c$ instead of the output currents $i_{sa}$, $i_{sb}$, $i_{sc}$. FIG. 29 shows the current feedback loop with a derivative element 97. Two loops are needed to obtain $i_a$, $i_b$, and $i_c$. In this case, AC link frequency corresponding to the resonant inductor 41 and resonant capacitor 40 is almost completely filtered by the load capacitances 95. Hence, feedback was easily accomplished without any further filtering. The derivative circuit was implemented by a simple R-C circuit 97 as shown in FIG. 29. The time constant was selected as 50 s and the gain was 2.0. The resulting waveform is shown in FIG. 31 and can be compared to the case without derivative feedback, i.e., $K_{drv} = 0$ in FIG. 30. The system is completely unstable without feedback as shown in FIG. 30 but the system is stabilized by using derivative feedback, although it still has an oscillation as shown in FIG. 31. The remaining high frequency oscillation over 2 kHz is ripple caused by the discrete current pulses.

Figure 32:
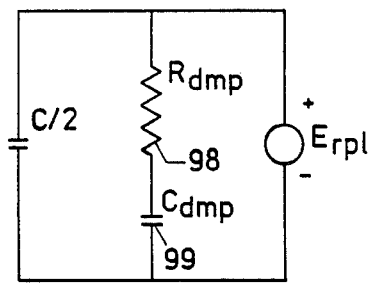
FIG. 32 is a schematic circuit diagram of a single phase damping circuit.
Figure 33:
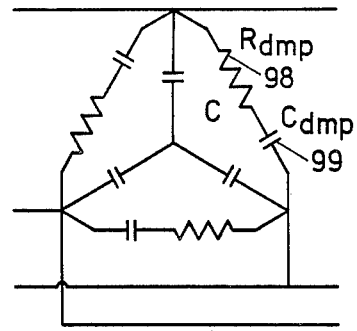
FIG. 33 is a schematic circuit diagram of a three phase R-C damping circuit.

In order to further reduce or absorb the high frequency component caused by the current pulses, the damper circuit shown in FIG. 32 has been found to be effective. The damping circuit utilizes a resistance 98 (of resistance $r_{dmp}$) and capacitor 99 (of capacitance $C_{dmp}$). If the voltage of ripple component is assumed to be $E_{rpl}$ in the expression of the RMS phasor, the current through the resistor 98 is obtained from $$I_{dmp} = \frac{E_{rpl}}{\sqrt{R_{dmp}^2 + \frac{1}{\omega_{rpl}^2 C_{dmp}^2}}}$$

and the dissipated energy $P_{dss}$ in $R_{dmp}$ will be $$P_{dss} = I_{dmp}^2 R_{dmp} \text{ (for single phase model)} = E_{rpl}^2 C_{dmp} / \left[ \left( \sqrt{R_{dmp}} - \frac{1}{\sqrt{R_{dmp}\ C_{dmp}\omega_{rpl}}} \right)^2 + \frac{2}{\omega_{rpl} C_{dmp}} \right]$$

Hence, the resistance $R_{dmp}$ is selected as $$R_{dmp} = \frac{1}{\omega_{rpl} C_{dmp}}$$

and the maximum dissipation $P_{dmax}$ can be calculated in the form $$P_{dmax} = E_{dmp}^2 C_{dmp} \omega_{rpl}$$

Figure 34:
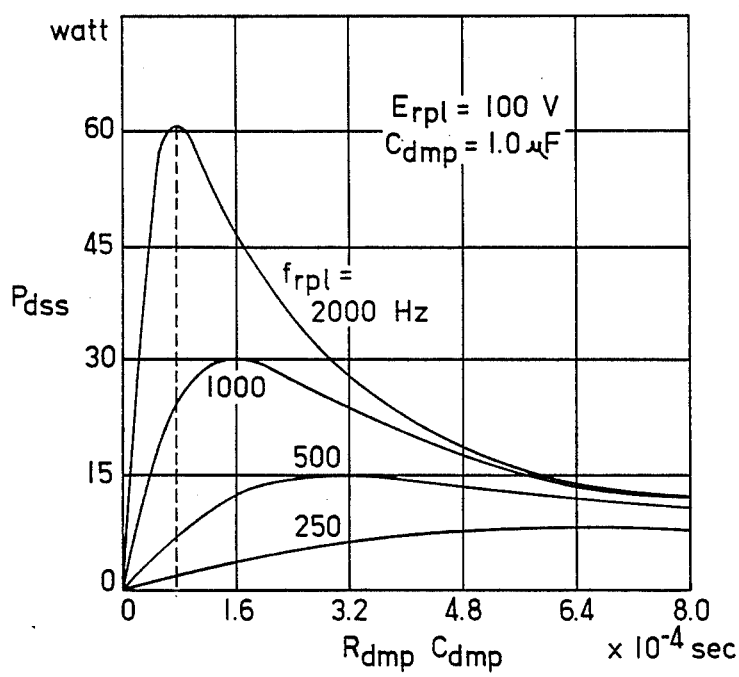
FIG. 34 is a graph illustating the dissipated energy in damping resistor $R_p$.

Using the resistance $R_{dmp}$ value as calculated above, the dissipation in the output at fundamental frequencies becomes extremely small. FIG. 34 shows the dissipation $P_{dss}$ as a function of the time constant $\tau_{dmp} = R_{dmp} C_{dmp}$ and ripple frequency $f_{rpl}$ when the capacitance $C_{dmp}$ is assumed constant. For example, if the ripple frequency and capacitance $C_{dmp}$ are assumed to be 2000 Hz and 1.0μF, respectively, then $R_{dmp}$ becomes 80 ohms from the condition of the three error signals summing to zero, and the time constant $\tau_{dmp} = R_{dmp} C_{dmp}$ equals 80 microseconds.

If the fundamental frequency is 50 Hz then, from the characteristic for $\tau_{dmp}$ equal to 80 μs in FIG. 34, the dissipated energy both in ripple frequency and in fundamental frequency are $$P_{dss} = 60 \text{ watts (2000 Hz)}$$
$$= 0.56 \text{ watts (50 Hz)}$$

Hence the fundamental component is negligible and the dominant dissipating energy is the ripple component and very strong selective frequency damping will be performed.

Figure 35:
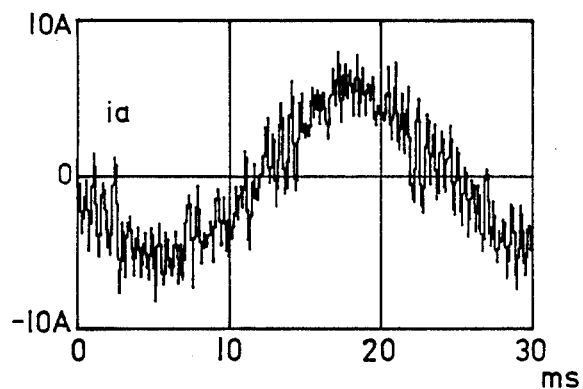
FIG. 35 is a graph illustrating output current employing damping circuit only.
Figure 36:
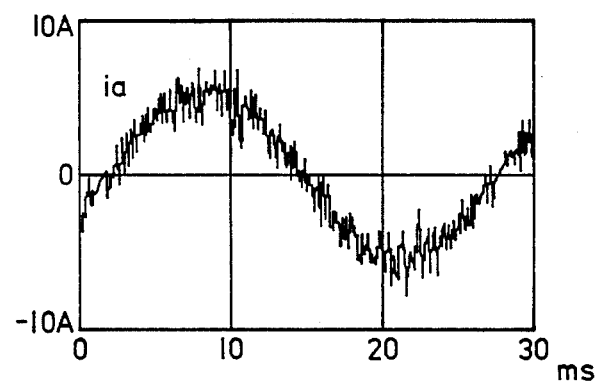
FIG. 36 is a graph illustrating output current employing both derivative feed-back and damping circuit.
Figure 37:
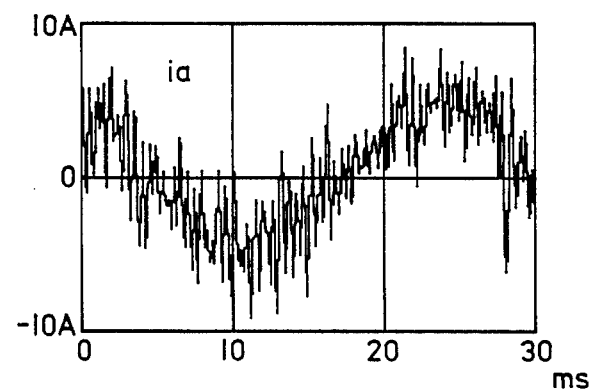
FIG. 37 is a graph illustrating output current without the use of either a damping circuit or derivative feed-back.

FIGS. 35 and 36 show the results of using damping circuits for the systems whose non-damped responses are shown in FIGS. 30 and 31, respectively. Remarkable improvement is apparent in both cases. In the case of non-derivative feedback (FIG. 36), the system was stabilized and a much smaller ripple in the current was obtained. As shown in FIG. 36, the damping capacitance is almost comparable to the output capacitance, so that the capacitance C's are increased in FIG. 37 while the other parameters are the same as in FIG. 36. Though a better result was obtained in FIG. 37, this waveform still contains a larger ripple than in FIG. 36.

Figure 38:
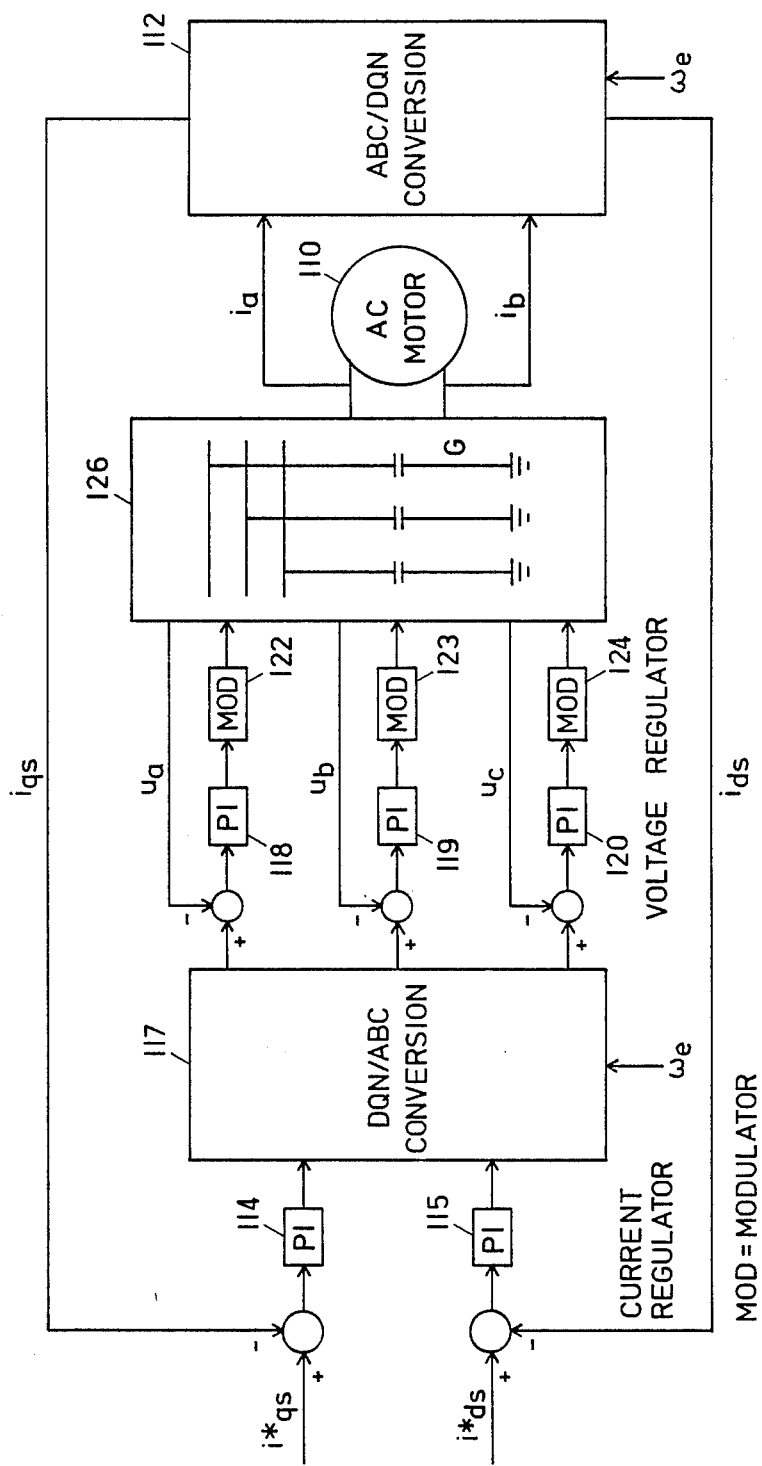
FIG. 38 is a block diagram of another control system for the conversion apparatus.
Figure 39:
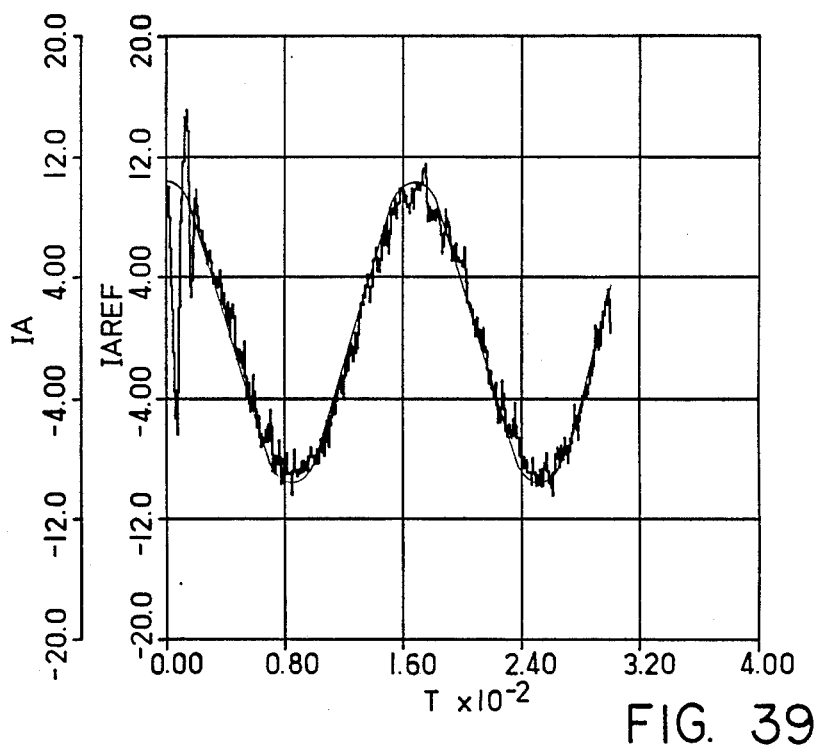
FIG. 39 is an illustrative graph of motor current utilizing the control system of FIG. 38.

FIG. 38 illustrates another control scheme which utilizes an internal voltage regulator in the ABC frame of reference and an external current regulator in the synchronous DQN reference frame. The choice of the synchronous reference frame for the outer loop is related to the optimized performance of proportional integral regulators with only DC signals. As shown in FIG. 38, phase currents $i_a$ and $i_b$ being supplied to a motor 110 are provided to a control unit 112 which converts to a DQN reference, providing output current values $i_{qs}$ and $i_{ds}$. These values are compared to reference values $i^*_{qs}$ and $i^*_{ds}$ and the difference provided to proportional integral controllers 114 and 115, the outputs of which are converted by a control unit 117 to ABC values. These are compared in the internal loops to measured voltages $V_a$, $V_b$ and $V_c$, and the differences are provided to proportional integral controllers 118, 119, and 120, and modulators 122, 123, and 124, the outputs of which are provided to the switching sequence matrix to drive the inverter 126.

Figure 40:
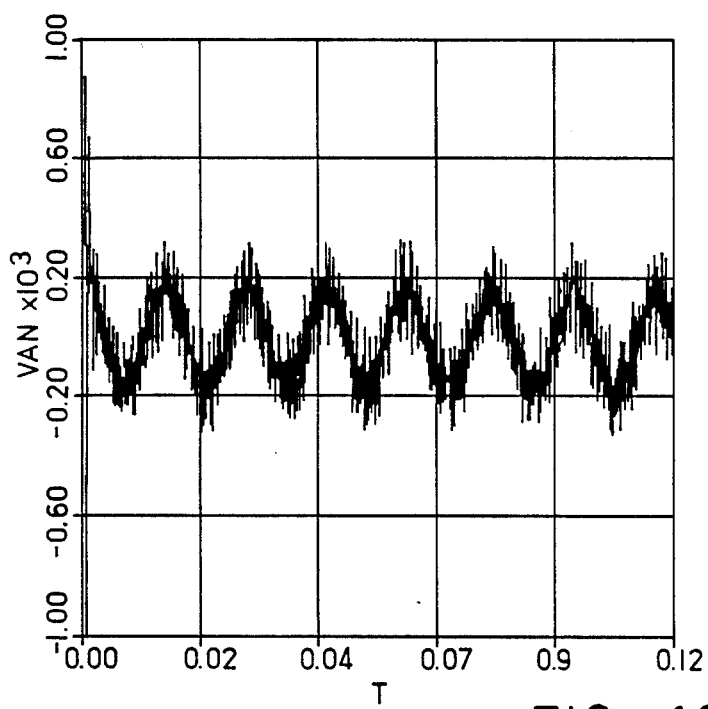
FIG. 40 is an illustrative graph of motor voltage utilizing the control system of FIG. 38.

This control structure essentially eliminates any resonance frequency in the output waveforms of voltage and current. FIGS. 30 and 40 are illustrative graphs of motor current and voltage with this control system employed. This control scheme is suitable for application with various strategies of speed regulation, such as direct or indirect field orientation control and slip control.

It may be noted that although the systems of the present invention are well suited to the use of force commutated switching devices such as thyristors, self commutated devices such as transistors and GTO's may be utilized if desired.

It is understood that the invention is not limited to the particular embodiments set forth herein as illustrative, but embraces all such modified forms thereof as come within the scope of the following claims.

What is claimed is:

1. A power converter for converting DC power to AC power comprising:
   (a) a DC series resonant link circuit having a capacitor adapted to receive a DC power input, a first inductor connected in series with the capacitor, a second inductor connected in parallel with at least the capacitor, and a DC current bus providing the output current from the resonant circuit;
   (b) means for causing the resonant circuit to oscillate stably at or near its resonant frequency and for the current on the DC current bus to be maintained at a desired average DC level and to go to zero current at least once during each cycle of oscillation of the resonant circuit; and
   (c) an inverter connected to receive the current on the DC bus and having gated switching devices which are switched on and off only when the current on the DC bus feeding the inverter is substantially zero.

2. The power converter of claim 1 wherein the inverter includes series connected pairs of gated switching devices connected to receive the current from the DC current bus, each gated switching device turned on and off only at times of substantially zero current feeding the inverter in a manner such that the currents between the pairs of switches varies cyclically as a function of time at a desired frequency.

3. The power converter of claim 2 wherein the means of causing the resonant circuit to oscillate includes a top and bottom inverter switching device and means for controlling the devices to be in the on state at the same time.

4. The power converter of claim 1 wherein the gated switching devices are thyristors.

5. The power converter of claim 1 wherein the means for causing the current on the DC current bus to be maintained at a desired average DC level and to go to zero at least once during each cycle of oscillation includes a gated switching device connected across the series connected capacitor and first inductor and means for triggering the gated switching device to conduct when the DC bus current goes to zero.

6. The power converter of claim 5 wherein the gated switching device is a thyristor.

7. A power converter for converting DC power to AC power comprising:
   (a) power supply means for providing DC output power;
   (b) a DC series resonant link circuit having a capacitor connected to receive the DC power from the power supply means, a first inductor connected in series with the capacitor, a second inductor in parallel with the capacitor and in series with the first inductor, and a DC current bus providing output current from the resonant circuit;
   (c) means for causing the resonant circuit to oscillate stably at or near its resonant frequency and for the current on the DC current bus to be maintained at a desired average DC level and to go to zero current at least once during each cycle of oscillation of the resonant circuit; and
   (d) an inverter connected to receive the current on the DC bus and having gated switching devices which are switched on and off only when the current on the DC bus feeding the inverter is subtantially zero.

8. The power converter of claim 7 wherein the inverter includes series connected pairs of gated switching devices connected to receive the current from the DC current bus, with each gated switching device being turned on and off only at times of subtantially zero current feeding the inverter in a manner such that the currents between the pairs of switches varies cyclically as a function of time at a desired frequency.

9. The power converter of claim 7 wherein the means for causing the resonant circuit to oscillate includes a top and bottom inverter switching device and means for controlling the devices to be in the on state at the same time.

10. The power converter of claim 7 wherein the switching devices are thyristors.

11. The power converter of claim 7 wherein the first inductor has a tapped connection point and including a gated switching device connected between the inductor tap point and the DC power input, and wherein the switching device is gated when the DC bus current reaches zero.

12. The power converter of claim 11 wherein the gated switching device is a thyristor with its anode connected to the inductor tap point and its cathode connected to the DC power input.

13. The power converter of claim 7 wherein the power supply means includes pairs of switching devices connected in a bridge configuration to a source of alternating current power and having outputs connected to provide DC power to the resonant circuit.

* * * * *